(12) United States Patent
Steiner et al.

(10) Patent No.: US 6,628,569 B1
(45) Date of Patent: Sep. 30, 2003

(54) FISHFINDER DEVICE WITH INTEGRATED CONTROLLER

(75) Inventors: Mark Steiner, Alpharetta, GA (US); Nicole Dermikaelian Convault, Cumming, GA (US); Darrell Watt, Marietta, GA (US)

(73) Assignee: Techsonic Industries, Inc., Eufala, AL (US)

( * ) Notice: Subject to any disclaimer, the term of this patent is extended or adjusted under 35 U.S.C. 154(b) by 0 days.

(21) Appl. No.: 10/042,501

(22) Filed: Jan. 9, 2002

(51) Int. Cl.[7] ............................................... G01S 15/96
(52) U.S. Cl. ....................................................... 367/111
(58) Field of Search ........................... 367/111; 345/719

(56) References Cited

U.S. PATENT DOCUMENTS 4,829,493 A  5/1989  Bailey ........................ 367/111

OTHER PUBLICATIONS

Eagle®, Fisheasy Operation Instructions, © 2000, pp. 1–38.*
Humminbird, 100SX Operations Manual, 2003, pp. 1–30.*
Humminbird, Piranha™ 1 webpage, © 2003, pp. 1–2.*
"Florida Sportsman" May 2000. p. 29, 59,144.
"LPG 2000 Operations Manual" Zercom Marine; p. 1–32.
"Humminbird fish wide open!" ©1997 Humminbird, a subsidiary of Teleflex Inc. #1 Hummingird Lane, Eufaula, AL 36027.

* cited by examiner

*Primary Examiner*—Daniel Pihulic
(74) *Attorney, Agent, or Firm*—Baker, Donelson, Bearman Caldwell & Perkowitz

(57) ABSTRACT

A fishfinder device (10) with an integrated controller (11) for simplified operation, in which a control switch (20) causes a display (14) to present in a looping sequence an identifier (64) associated with each of a plurality of operational features (74) for selecting operational features to enable, disable or modify by operating a selection button (22, 24) during presentation of the identifier associated with the operational feature, the fishfinder device (10) including a transducer (62) for periodically transmitting an acoustic wave beam (63) and for receiving return signals of the acoustic wave beam reflected from detected underwater articles (65) and a display (14) for displaying images representative of the detected underwater articles (65, 67, 69) based on the return signals from the transmissions of acoustic wave beams, while the controller (18) provides the plurality of operational features (74) for the fishfinder device (10). A method of operating the fishfinder device (10) is disclosed.

8 Claims, 3 Drawing Sheets

FISHFINDER DEVICE WITH INTEGRATED CONTROLLER

TECHNICAL FIELD

The present application relates to fishfinder devices. More particularly, the present invention is directed to controls for selecting and implementing operational features for fishfinder devices for simplified operation.

BACKGROUND OF THE INVENTION

Fishfinder devices are marine electronic equipment used for locating underwater articles. In particular, fishfinding devices are used by commercial and sports fisherman for locating fish as well as identifying bottom features which may suggest the possible presence of fish. Fishfinder devices use sonar technology to send acoustic waves or beams from a transducer into the water. The acoustic beams reflect from underwater articles, such as fish, obstructions, and the bottom surface. The reflected beams return to the transducer as "echos". The return echos are communicated as a signal to an analyzer in the fishfinder device. The analyzer creates an image on a display representative of the articles from which the return echos reflect.

Fishfinder devices often include features to enhance the operation and use of the device. These features include selectively setting the depth range for which the fishfinder device reports information, the contrast of the display screen containing information representative of the detected underwater articles, the sensitivity of the transducer to the reflected signals, among other features conventionally provided in fishfinder devices commercially available, such as HUMMINBIRD brand fishfinders available from Techsonic Industries, Inc., of Eufaula, Ala.

The fishfinder device typically has switch buttons and rotatable switches used for selecting and/or adjusting the operational features of the fishfinder. For example, a rotatable switch typically adjusts the display between low and high contrast levels.

While these fishfinder devices have provided satisfactory displays of underwater information, there are drawbacks to their use. In particular, the close proximity of the push buttons and knobs of the rotatable switches lead to difficulty in the operation. A button may inadvertently be actuated when reaching towards another of the switches. In other instances, the fisherman wear gloves, and this makes it difficult to grasp the knobs for accurate setting of the particular feature and to push the correct switch to select or adjust the particular desired feature.

Accordingly, there is a need in the art for improved fishfinder devices having integrated controllers for simplified operation of such devices. It to such that the present invention is directed.

BRIEF DESCRIPTION OF THE PRESENT INVENTION

The present invention meets the need in the art for improved fishfinder devices having an integrated controller for simplified operation with a transducer for periodically transmitting an acoustic wave beam and for receiving return signals of the acoustic wave beam reflected from detected underwater articles and a display for displaying images representative of the detected underwater articles based on the return signals from the transmissions of acoustic wave beams. The controller provides a plurality of operational features for the fishfinder device. The operational features are selected by a control switch operatively engaged to the controller. The control switch, upon activation, activates the operation of the fishfinder device, presents on the display in a looping sequence an identifier associated with each one of the operational features, and deactivates the operation of the fishfinder device. The fishfinder device includes at least one selection button operable to selectively enable, disable, and set an option for the operational feature associated with the displayed identifier. The control switch, being operated, accordingly activates the fishfinder device, causes a display of identifiers for the operational features of the fishfinder device in the looping sequence of said identifiers and deactivates the operation of the fishfinder device. The control switch, with use of the selection button sets a selected option for the displayed one of the operational features also.

In another aspect, the present invention provides a method of operating a fishfinder device, comprising the steps of:

(a) operating a control switch to activate a fishfinder device;

(b) providing periodic transmission of an acoustic wave beam from a transducer and receipt of return signals of the acoustic wave beam reflected from detected underwater articles;

(c) providing presentation on a display images representative of the detected underwater articles based on the return signals from the transmissions of acoustic wave beams;

(d) enabling the control switch to provide a plurality of operational features for the fishfinder device, each operational feature having an associated identifier, the control switch being activated to present on the display the identifier associated with one of said operational features, whereby the operational feature associated with the displayed identifier can be selected;

(e) allowing for modification of the operational feature by operating a selection button to set a selected option for the operational feature associated with the displayed identifier, and (f) operating the control switch to deactivate the operation of the fishfinder device;

whereby the control switch, being operated periodically, causes the activation oft he fishfinder device, the display of identifiers for the operational features of the fishfinder device in a looping sequence of said identifiers and with use of the selection button the setting of a selected option for the displayed one of the operational features, and the deactivation of said fishfinder device.

Objects, features, and advantages of the present invention will become apparent from a reading of the following detailed description of the invention and claims in view of the appended drawings.

DETAILED DESCRIPTION OF THE PREFERRED EMBODIMENTS

Figure 1:
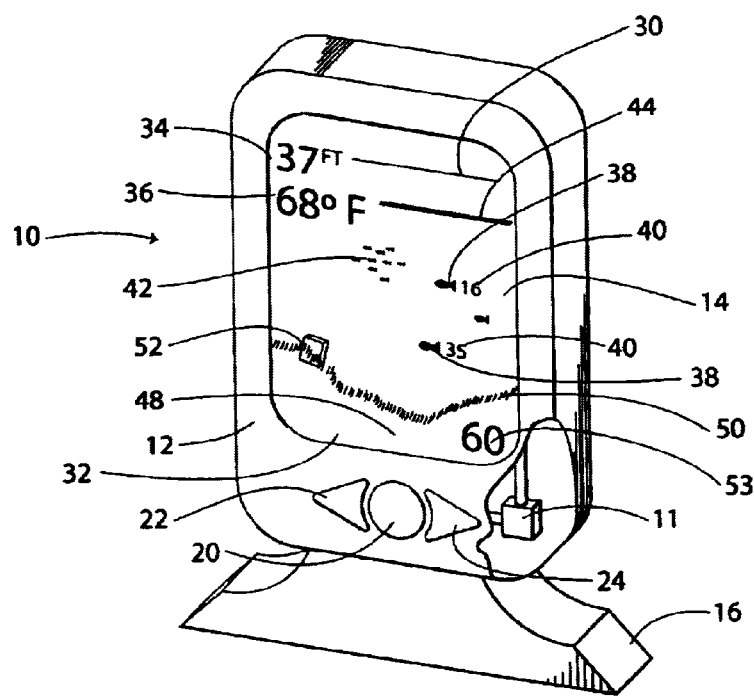
FIG. 1 illustrates in perspective view a fishfinder device with an integrated controller for simplified operation in accordance with the present invention.

Referring now in more detail to the drawings, in which like numerals indicate like parts throughout the several views, FIG. 1 is a perspective view of an embodiment of a fishfinder device 10 having an integrated controller 11 for simplified operation in accordance with the present invention.

Figure 3:
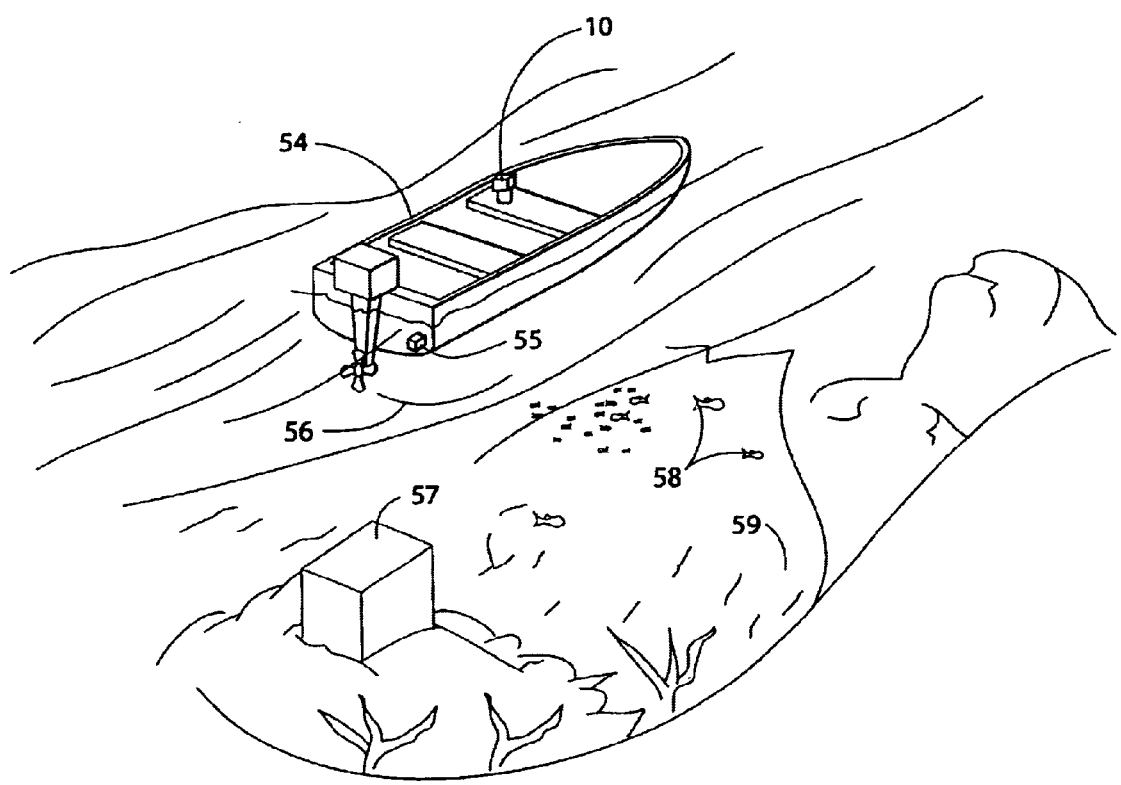
FIG. 3 is a perspective view of a boat that includes the fishfinder device with the integrated controller illustrated in FIG. 1.

The fishfinder device 10 includes a housing 12 having a display screen 14 and is supported by a stand 16 that conventionally mounts to a surface, such as a boat operating console, as illustrated in FIG. 3. The housing 12 encloses the controller 11 which in a preferred embodiment is a microprocessor. The controller 11 includes operating software for directing the operational features or functional actions of the fishfinder device 10. A control switch 20 is operatively associated with the controller 18. The control switch 20 communicates with the controller 18 for selectively operating (that is, enabling, disabling, or setting an option) for the various operational features of the fishfinder device 10, as discussed with particularity below with respect to the operational features. At least one selection switch 22 communicates with the controller 18. The switch 22 is actuated to enable, disable, or select options for the operational features selected with the control switch 20, as discussed below. In the illustrated embodiment, the fishfinder device 10 includes a second selection switch 24 also for use with selecting options for some of the operational features of the fishfinder device 10.

The display screen 14 presents information useful for finding fish or submerged articles using the fishfinder device 10. The display screen 14 includes a upper line 30 representative of the surface of the water. The bottom of the display 32 corresponds to the depth range selected for the current water depth. The value 34 of the depth of the body of water is displayed together with the water temperature 36 (in embodiments of the fishfinder device 10 having a temperature sensor.) Fish icons generally 38 are displayed on the screen 14. In the illustrated embodiment, a depth value 40 is selectively associated with each fish icon 38. Bait fish generally 42 are denoted by smaller trace images. A thermocline or temperature gradient 44 is displayed. Thermoclines indicate underwater temperature changes. A bottom contour 46 provides an indication of the bottom of the body of water. A thicker portion 48 of the bottom contour 46 indicates a soft bottom while a thinner portion 50 generally indicates a firmer bottom surface. A submerged structure 52 is indicated by a block-image. The depth range 53 is displayed in a lower corner of the display screen 14.

FIG. 3 is a perspective view of a boat 54 in which the fishfinder device 10 mounts to an operating console of the boat. A conventional transducer 55 mounts to the hull of the boat 54 and connects by a communications cable to the fishfinder device 10. It is to be appreciated that the operational features 74 of the fishfinder device 10 are of types provided by HUMMINBIRD brand fishfinder devices available from Techsonic Industries, Inc. The transducer 55 communicates a sound or acoustic beam 56 for detecting underwater articles such as structures 57, fish 58, and the bottom 59. These reflect return signal of the acoustic beam 56 to the transducer 55.

Figure 2:
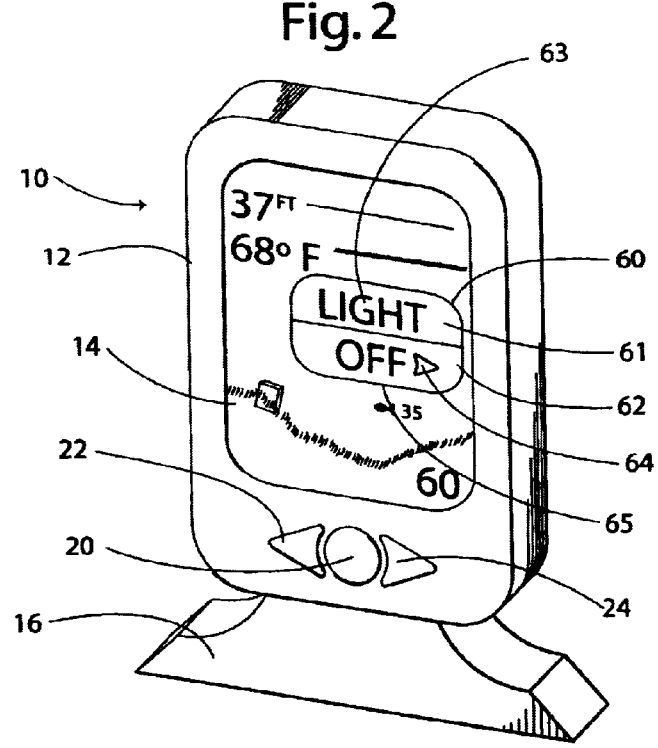
FIG. 2 illustrates in perspective view of the fishfinder device shown in FIG. 1 having the integrated controller activated for simplified selection and adjustment of the operating features of the fishfinder device in accordance with the present invention.

FIG. 2 illustrates in perspective view the fishfinder device 10 with the display screen 14 presenting a window 60 that includes an identifier field 61 and an options field 62. The identifier field 61 includes a graphic or text identifier 63 associated with one of the operating features 74. Each operating feature 74 has a unique identifier. This enables the operating feature to be selected during use of the fishfinder device 10, as discussed below. The options field 62 presents the selectable options (enable, disable, and/or settable option) associated with the particular operation feature subject of the identifier 63 displayed in the identifier field 61. The options field 62 includes one or more icons 64 corresponding to the selection switches 22, 24 and icons 65 corresponding to the selectable option for the operating feature associated with the displayed identifier. Each operating feature has an associated identifier that allows the user of the fishfinder device 10 to select the operating feature to be enabled, disabled, or modified as discussed below.

Figure 4:
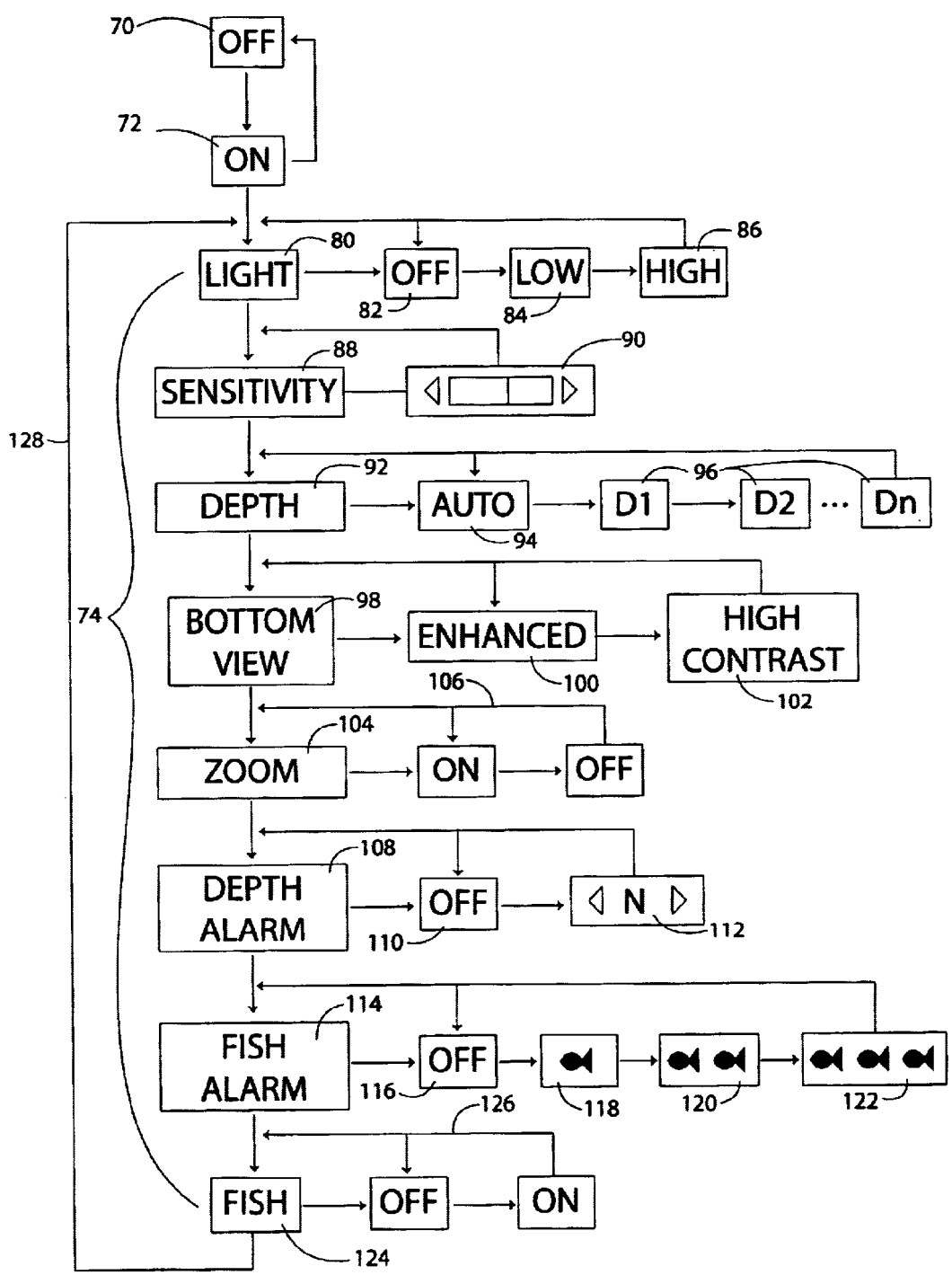
FIG. 4 is a schematic illustration of the operation of the fishfinder device with the integrated controller illustrated in FIG. 1.

With reference to FIG. 4, the present invention provides the integrated control switch 20 for turning the fishfinder device 10 on 72 and off 70, as well as selecting the operational features generally 74 of the fishfinder device 10 for enabling, disabling, or modifying by selecting a particular option associated with each operating function, as discussed below. The control switch 20 is preferably a momentary switch biased by a spring to a disabled position, but is readily actuated to an enabled position. The control switch 20 is momentarily pressed and moved to the actuated position to perform a selected function based on the pre-existing operating state of the fishfinder device 10 as shown by Table I below.

TABLE I

Actuation Table Based On Existing Operating State
(Press Control Switch 20 To Accomplish The Next Function)

| Operating State Of Fishfinder Device 10 | Function To Be Accomplished By The Fishfinder Device 10 |
| --- | --- |
| Off (70) | Turn the fishfinder device 10 on (72) |
| On (72) | Activate display of the identifier of one of the operating features (74) of the fishfinder device 10 |
| Displaying an identifier of one of the operating features | Display next operating feature in the sequential loop of operating feature (see 74) |

If the state of the fishfinder device 10 is "on" 72, whether displaying an identifier of one of the operating features 74 or not, holding the control switch 20 for a predetermined period more than a momentary period (for example, for 2 or more seconds) causes the fishfinder device 10 to power down and shut off 70.

The operating features generally 74 are accessed through a looping menu sequence by activation of the integrated control switch 20. With the fishfinder device turned on, momentarily pressing the control switch 20 activates the menu selection loop (see 74).

The single control switch 20 is pressed repeatedly to enable the user of the fishfinder device 10 to access in sequence the operating features associated with the fishfinder device as well as access and set parameters associated with each operating feature. The selection switches 22, 24 are used to select, change, or modify the parameter associated with the particular operating feature. The operating feature menu is automatically disabled from presentation on the display 14 after a predetermined period of time passes without the control switch 20 or the selection switches 22, 24 being activated. In a preferred embodiment, the predetermined period is about two seconds.

The operating features menu includes a light option 80. This option enables or disables a back light. If enabled, the back light illuminates momentarily for viewing the display 14 at night when the control switch 20 is initially activated for a particular sequence of presenting the identifiers on the display 14. The light option 80 includes three settings off 82, low 84, and high 86, which are selected in a looping sequence by the selection switch 22. A sensitivity option 88 is selected in a range 90 using the selection switches 22, 24 to affect how the sonar return beams are identified as fish icons 38. Generally, more fish will be detected at a higher sensitivity setting while fewer fish will be detected at a lower sensitivity setting. A depth option 92 selects the depth range. The depth range is set by pushing the control switch 22 for selecting automatic depth determining 94 or one of a series of manually set depths 96.

The bottom view 98 is enabled for enhanced definition 100 to illustrate bottom hardness and structures while the high option contrast 102 provides a blacked-out bottom on the display for a high contrast bottom definition. This facilitates viewing the display 14 from a distance. A zoom feature 104 is enabled on and disabled off 106 by the selection switch 22. The zoom feature 104 magnifies the area around the bottom, thus revealing fish and structures close to the bottom that may not be visible in a view that has wide depth range. The zoom feature 104 changes the upper and lower depth range to keep the area displayed to slightly above and below the bottom. The zoom option 104 when activated thus provides a magnified image of the bottom with more details.

A depth alarm 108 is disabled off 110 or enabled on 112 using the selection switches 22, 24 representative of a depth at which an audible alarm sounds. The depth is selectable from shallow to deep, and in the illustrated embodiment ranges from 3 feet to 99 feet. The alarm sounds when the depth is equal to or less than the particular setting. A fish alarm 114 is disabled or enabled using the selection switches 22, 24. When enabled, the fish alarm sounds when big fish 118, big and medium fish 120, or all size fish 122 are detected by the fishfinder device 10. A fish discrimination feature 124 is enabled or disabled 126 using the selection switch 22. With the fish discrimination disabled, the display 14 includes images of all acoustic beam returns. With the fish discrimination enabled, the display 14 shows sonar beam returns that are determined to be a fish, which reduces the number of return signals for display.

With reference to FIGS. 2 and 4, the operation of the fishfinder device 10 in accordance with the present invention is described below. With the fishfinder device off 70, the control switch 20 is depressed momentarily, thus turning the fishfinder device on 72. In a preferred embodiment, the initial screen provides for user selection of "simulation" or "startup" for normal operation of the fishfinder device 10. The simulation mode provides a display on the display screen 14 of underwater items such as structures, fish, and bottom surfaces. The control switch 20 can be activated to change the operating features 74 of the fishfinder device 10 in the simulation mode, so that a user can become familiar with the operating features. To gain further experience with interpreting the information on the display 14, the user should vary the operating features 74 in a body of water with bottom surface familiar to the user.

After startup (or during on-going operation), the control switch 20 is momentarily depressed to activate the display of identifiers generally 74 associated with each operating feature of the fishfinder device 10. The identifier for the first operating feature in the sequence, light 80, is displayed on the screen 14. The particular light 80 option can be selected by pressing the selection button 22 in a looping submenu of off 82, low 84, and high 86. Upon selection, the operator either presses the control switch 20 momentarily to advance through the operating features 74 or leaves the control switch 20 and the selection switches 22, 24 un-activated. After a predetermined period without activation of the control switch 20 or the selection switches 22, 24, the fish finder device 10 automatically removes the display of the identifier for the operating feature, and thus returns to normal display operation.

However, momentarily pressing the control switch 20 repeatedly causes the controller 11 to step through the operating features 74 in sequence. In the illustrated embodiment, these operating features are the light 80, sensitivity 88, depth 92, bottom view 98, zoom 104, depth alarm 108, fish alarm 114, and fish discrimination 124 before returning 128 to the beginning of the sequence of these operating features.

For each operating feature generally 74, there is an associated option which can be set using the selection switches 22, 24. For example, for the zoom 104, feature the option is either enabled or disabled 106 using the selection switch 22. The depth alarm feature 108 is selectively deactivated 110 or using the selection switches 22, 24, a number N for the depth that which the alarm is to be sounded is selected. In the illustrated embodiment the depth is selectable from a range of 3 ft. to 99 ft. The selection switches 22, 24 are represented by directional arrows which indicate decrease or increase the value N shown on the display. The schematic flowchart in FIG. 4 as discussed above illustrates the various operating features 74 and the associated options for each.

To turn the fishfinder device 10 off, the control switch 20 is held in a enabled position for a predetermined period greater than the momentary enabling period. In the illustrated embodiment, holding the control switch 20 enabled for 2 to 3 seconds causes the fishfinder device 10 to power down and turn off.

In accordance with conventional fishfinder devices and with reference to FIG. 3, the fishfinder 10 periodically transmits acoustic waves 56 from the transducer 55 through the water. As illustrated in FIG. 1, images representative of the return "echos" from structures 57, fish 58, and the bottom 59 are pictured on the display 14 as structure images 52, fish 38, or bottom contour 46, to create a view of the detected underwater articles, with information about the distance to these underwater, based on enabled operational features and options selected using the control switch 20 in a looping sequence together with the selection switches 22, 24.

The present invention accordingly provides the integrated controller 18 for the fishfinder device 10 actuated by the single control switch 20 for presenting on the display 14 the identifiers associated with the operational features for selective enabling, disabling, or setting of an option using the selection switches 22, 24 in order to effect simplified operation of the fishfinder device. The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. A fishfinder device with an integrated controller for simplified operation, comprising:
   a transducer for periodically transmitting an acoustic wave beam and for receiving return signals of the acoustic wave beam reflected from detected underwater articles;
   a display for displaying images representative of the detected underwater articles based on the return signals from the transmissions of acoustic wave beams;
   a controller providing a plurality of operational features for the fishfinder device;
   a control switch operatively associated with the controller for activating the operation of the fishfinder device, for selecting one of the plurality of operational features of the fishfinder device to activate or modify settings thereof by a looping sequential presentation on the display of an identifier associated with each one of said operational features in response to operating said control switch, and for deactivating the operation of the fishfinder device; and
   at least one selection button operable to selectively set an option for one or more of the operational features,
   whereby the control switch, being operated, activates the fishfinder device, causes a display of identifiers for the operational features of the fishfinder device in the looping sequence of said identifiers and with use of the selection button sets a selected option for the displayed one of the operational features, and deactivates the operation of the fishfinder device.

2. The fishfinder device with the integrated controller as recited in claim 1, wherein the control switch deactivates the operation of the fishfinder device upon holding the control switch for a predetermined period.

3. The fishfinder device with the integrated controller as recited in claim 1, wherein the display of the identifiers automatically terminates after a predetermined period without operating either the control switch or the selection button.

4. The fishfinder device with the integrated controller as recited in claim 1, further comprising a light source activated for a predetermined period upon activation of the control switch to initiate a looping sequence of identifiers for the operational features.

5. A method of operating a fishfinder device, comprising the steps of:

(a) operating a control switch of a controller to activate a fishfinder device, (b) providing periodic transmission of an acoustic wave beam from a transducer and receipt of return signals of the acoustic wave beam reflected from detected underwater articles;

(c) providing presentation on a display images representative of the detected underwater articles based on the return signals from the transmissions of acoustic wave beams;

(d) enabling the control switch to provide a plurality of operational features for the fishfinder device, each operational feature having an associated identifier, the control switch being activated to present on the display the identifier associated with one of said operational features whereby the operational feature associated with the displayed identifier can be selected;

(e) allowing for modification of the operational feature by operating a selection button to set an option for the operational feature associated with the displayed identifier, and (f) operating the control switch to deactivate the operation of the fishfinder device;
   whereby the control switch, being operated periodically, causes the activation oft he fishfinder device, the display of identifiers for the operational features of the fishfinder device in a looping sequence of said identifiers and with use oft he selection button the setting of a selected option for the displayed one of the operational features, and the deactivation of said fishfinder device.

6. The method of operating a fishfinder device as recited in claim 5, further comprising the step of enabling the deactivating the operation of the fishfinder device upon holding the control switch for a predetermined not momentary period.

7. The method of operating a fishfinder device as recited in claim 5, wherein step (b) provides for automatic termination of the display of the identifier after a predetermined period without operating either the control switch or the selection button.

8. The method of operating a fishfinder device as recited in claim 5, further comprising the step of providing for illumination of a light source upon activation of the control switch in the display of the identifiers.

* * * * *

UNITED STATES PATENT AND TRADEMARK OFFICE
CERTIFICATE OF CORRECTION

PATENT NO. : 6,628,569 B1
DATED : September 30, 2003
INVENTOR(S) : Mark Steiner, Nicole Covault and Darrell Watt It is certified that error appears in the above-identified patent and that said Letters Patent is hereby corrected as shown below:

<u>Column 8,</u>
Lines 25 and 28, change "oft he" to -- of the --.

Signed and Sealed this

Twenty-third Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,628,569 B2
DATED : September 30, 2003
INVENTOR(S) : Hirosi Fukuda It is certified that error appears in the above-identified patent and that said Letters Patent is hereby corrected as shown below:

<u>Title page,</u>
Item [30], Foreign Application Priority Data, please delete:
"Mar. 12, 1997 (JP) …………..9-63696" and add:
-- Feb. 12, 1997 (JP) …………..9-63696 --

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,628,569 B1
DATED          : September 30, 2003
INVENTOR(S)    : Mark Steiner et al.

It is certified that error appears in the above-identified patent and that said Letters Patent is hereby corrected as shown below:

This certificate supersedes Certificate of Correction issued January 13, 2004, the number was erroneously mentioned and should be vacated since no Certificate of Correction was granted.

Signed and Sealed this

Fifteenth Day of June, 2004

JON W. DUDAS
*Acting Director of the United States Patent and Trademark Office*